United States Patent [19]

Ware

[11] Patent Number: 4,700,325
[45] Date of Patent: Oct. 13, 1987

[54] BINARY TREE CALCULATIONS ON MONOLITHIC INTEGRATED CIRCUITS

[75] Inventor: Frederick A. Ware, Los Altos Hills, Calif.

[73] Assignee: Hewlett-Packard Company, Palo Alto, Calif.

[21] Appl. No.: 578,162

[22] Filed: Feb. 8, 1984

[51] Int. Cl.$^4$ ............................................. G05F 7/50
[52] U.S. Cl. .................................. 364/768; 364/770; 364/784
[58] Field of Search ............... 364/768, 770, 786, 787, 364/788, 784

[56] References Cited

U.S. PATENT DOCUMENTS

| | | | |
|---|---|---|---|
| 3,553,446 | 8/1966 | Kruy | 235/175 |
| 3,728,532 | 4/1973 | Pryor | 235/175 |
| 3,987,291 | 10/1976 | Gooding et al. | 235/175 |
| 4,052,604 | 10/1977 | Maitland et al. | 364/786 |
| 4,110,832 | 10/1978 | Leininger et al. | 364/786 |
| 4,138,731 | 2/1979 | Kamimoto et al. | 364/787 |
| 4,153,939 | 5/1979 | Kudou | 364/770 |
| 4,157,590 | 6/1979 | Grice et al. | 364/787 |
| 4,168,530 | 9/1979 | Gajski et al. | 364/760 |
| 4,348,736 | 9/1982 | Weinberger | 364/787 |
| 4,422,157 | 12/1983 | Uhlenhoff | 364/786 |
| 4,425,623 | 1/1984 | Russell | 364/786 |
| 4,559,608 | 12/1985 | Young et al. | 364/786 |

OTHER PUBLICATIONS

MacSorley, "High Speed Arithmetic in Binary Computers", *Proceeding of the IRE*, vol. #49, No. 1, pp. 67-91, Jan. 1961.
Weinberger, "A 32-Bit Adder Using Partitioned Memory Arrays as Universal Logic Elements", *IBM Technical Disclosure Bulletin*, vol. 14, #1, pp. 205-207, Jan. 1971.
Unger, "Tree Realizations of Iterative Circuits", *IEEE Trans. on Computers*, vol. C-26, #4, pp. 365-383, Apr. 1977.
Schmookler, "Two-Level Programmed Logic Array Adder", *IBM Technical Disclosure Bulletin*, vol. 21, #11, Apr. 1979, pp. 4313-4316.
Bechade et al., "Inverted Carry Propagation Cham", *IBM Technical Disclosure Bulletin*, vol. 25, #4, pp. 1818-1819, Sep. 1982.
O. J. Bedrij, "Carry-Select Adder", 3/26/1962 (364-788), IRE Transactions on Electronic Computers, pp. 340-346.
Hallin, Thomas G., Flynn, Michael J., "Pipelining of Arithmetic Functions"; Aug. 1972, IEEE Transactions on Computers, pp. 880-886.
J. Millman, "Microelectronics", pp. 170-171, McGraw-Hill, Inc. 1979.

*Primary Examiner*—Gary V. Harkcom
*Assistant Examiner*—Dale M. Shaw
*Attorney, Agent, or Firm*—Douglas L. Weller

[57] ABSTRACT

Integrated circuits for performing calculations such as carry propagate addition where the number of logic stages necessary to perform each calculation is proportional to $\log_2$ times the number of bits on which the calculation is performed. The circuits are divisible into a limited number of cells, thereby minimizing complexity, for ease of design and manufacture. Each cell comprises a device for accepting a bit or bits from an operand or operands and a device for accepting intemediate binary tree values. The cell then combines the input information to produce an arithmetic resultant and intermediate binary tree values for a next succeeding cell.

10 Claims, 12 Drawing Figures

BINARY TREE CALCULATIONS ON MONOLITHIC INTEGRATED CIRCUITS

BACKGROUND

The present invention relates to performing calculations, such as conditional carry addition, incrementation, and priority encoding, on a monolithic integrated circuit. The invention allows for the manufacture of relatively non-complex integrated circuits, wherein calculations can be made using a binary tree, so that the number of logic stages necessary to perform each calculation is proportional to $\log_2$ times the number of bits on which the calculation is performed.

Design of optimal large scale integrated circuits requires a minimization of chip complexity for ease of production, and a maximization of speed with which the circuit can perform a calculation. Complexity can be reduced by dividing a circuit into cells, wherein each cell performs part of a calculation, and each cell is identical or substantially similar to other cells on the circuit. Speed can be increased by reducing the number of logic stages necessary to perform a calculation, thereby reducing the delay it takes to perform a calculation.

Figure 1:
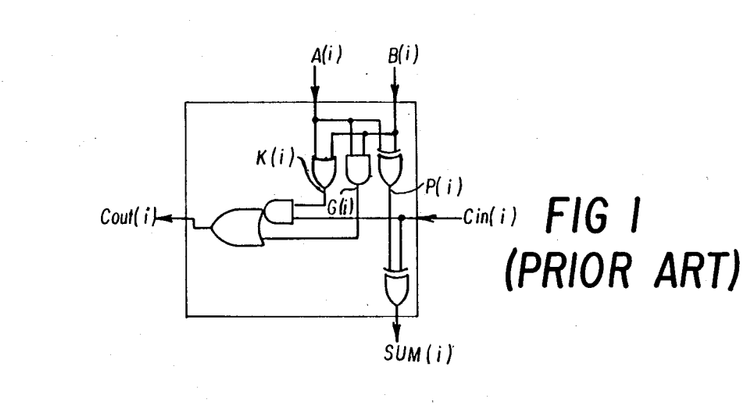
FIG. 1 shows a ripple adder cell for performing carry propagate addition according to the prior art.
Figure 2:
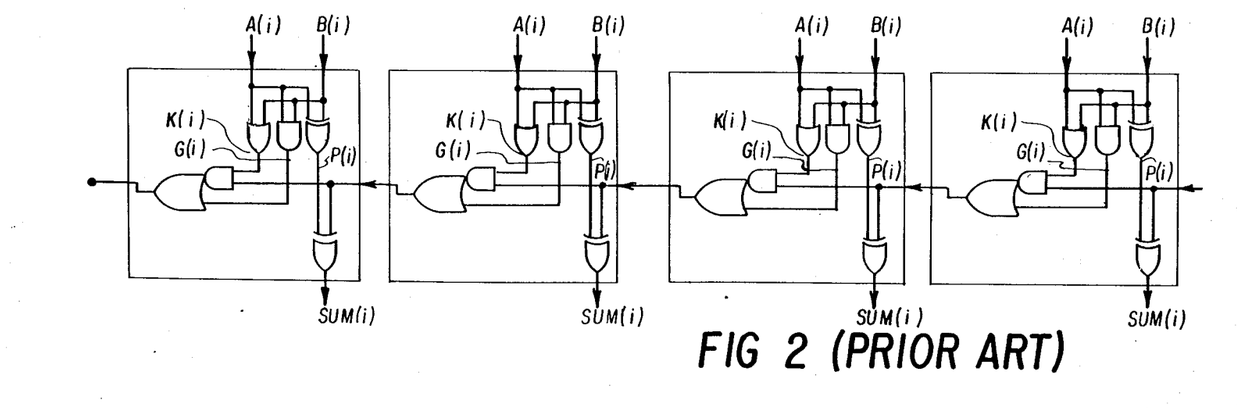
FIG. 2 shows a full binary ripple adder for performing carry propagate addition according to the prior art.

FIG. 1 shows a prior art ripple adder cell. $A_i$ and $B_i$ are individual $i_{th}$ order bits of the two operands to be added. $C_i(in)$ is the carry-in signal from the prior adder cell, $C_i(out)$ is the carry-out signal from the present cell, and $Sum_i$ is the sum signal of the present cell. The carry-out signal of one cell is the carry-in signal to the next cell. Using Boolean logic, where "+" is the Boolean "OR", "*" is the Boolean "AND", and "XOR" is the Boolean "exclusive-OR": the logic could be expressed as:

$Sum_i = (A_i \text{ XOR } B_i) \text{ XOR } C_i(in)$ $C_i(out) = ((A_i + B_i) * C_i(in)) + (A_i * B_i)$ FIG. 2 shows how a full ripple adder, for adding two binary numbers, can be formed by connecting any number of ripple adder cells in series. This can be done by connecting $C_i(out)$ to $C_{i+1}(in)$ for every ripple cell, 1 to n, where 1 is the least significant bit and n is the most significant bit of the binary addition.

The ripple adder can be implemented on a large scale integrated circuit with low chip complexity, because every ripple adder cell is exactly the same. The number of logic stages necessary for performing a calculation, however, is directly proportional to the number of bits, as each cell of the ripple adder performs one logic stage of the addition, and the calculation within each cell cannot be performed until the output of very prior cell is determined. This makes the ripple adder relatively slow.

Other prior art schemes have been able to increase the speed of addition and other calculations using such techniques as carry lookahead or other conditional carry techniques. At least one prior art scheme has provided a scheme wherein the number of logic stages necessary to perform each calculation is proportional to $\log_2$ times the number of bits on which the calculation is performed. (See copending patent application Ser. No. 410,807, Frederick A. Ware, "Conditional Carry Techniques For Digital Processors", filed Aug. 23, 1982; however no prior art has allowed for the production of circuits where the number of logic stages necessary to perform each calculation is proportional to $\log_2$ times the number of bits on which the calculation is performed, and the circuit may be layed out in a non-complex fashion.

SUMMARY OF THE INVENTION

In accordance with the preferred embodiment of the present invention there are provided integrated circuits for performing calculations such as carry propagate addition where the number of logic stages necessary to perform each calculation is proportional to $\log_2$ times the number of bits on which the calculation is performed. The circuits are divisible into a limited number of cells, thereby minimizing complexity, for ease of design and manufacture. Each cell comprises a means for accepting a bit or bits from an operand or operands and a means for accepting intermediate binary tree values. The cell then combines the input information to produce an arithmetic resultant and intermediate binary tree values for a next succeeding cell.

DESCRIPTION OF THE PREFERRED EMBODIMENT

Figure 3:
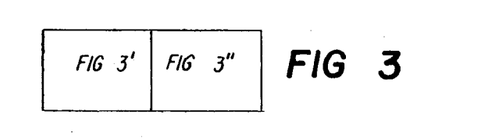
FIG. 3, consisting of FIGS. 3' and 3'', shows the schematic of an 8 bit adder embodying the present invention.

FIG. 3 shows a portion of a full adder according to the preferred embodiment of the present invention. A cell 100 of the full adder with a series of input wires 115, labeled A0, A1, B0, B1, C0, C1, D0, D1, E0, E1, F0, F1, G0, and G1, and a series of output wires 125, also labeled A0, A1, B0, B1, C0 D0, D1, E0, E1, F0, F1, G0, and G1. Input wires 115 and output wires 125 transfer intermediate binary tree values. What is meant by intermediate binary tree values is data transfered between cells which can be used to make binary tree calculations. Binary tree calculations are calculations done in a tree fashion so that the number of logic stages necessary to perform each calculation is proportional to $\log_2$ times the number of bits on which the calculation is performed—in this case the number of bits in each addend.

Input wires 115 are used by a carry-in logic box 130 to determine whether cell 100 has a carry-in. A cell adding two addend bits of $j^{th}$ order of magnitude (base 2) has a carry-in when a ripple adder cell adding addend bits of $j^{th}$ order would have a carry-in. Similarly a cell adding two addend bits of $j^{th}$ order has a carry-out when a ripple adder cell adding addend bits of $j^{th}$ order would have a carry-out.

Input wires 115 are also used by cell 100 to determine values for output wires 125. Output wires 125 are then used as a series of input wires 215 for a cell 200. The carry-in value for cell 100 appears on an output 131 of carry-in logic box 130.

Each cell performs a full add. For example, cell 100 performs a full add on an addend bit 116 labeled A, and an addend bit 117 labeled B. A sum 101, is determined by coupling addend bit 116 and addend bit 117 to the inputs of an "Exclusive Or" gate 110. The output of gate 110 is then coupled to an "Exclusive Or" gate 120. Also coupled to the input of gate 120 is an output 131 of logic box 130. The output of gate 120 is the sum 101.

Using Boolean logic:

Sum = A (XOR) B (XOR) C;

where Sum is sum 101, A is addend bit 116, B is addend bit 117 and C is the carry-in value on output 131 of carry-in logic box 130.

The adder performs carry lookahead using wires labelled: A0, A1; B0, B1; C0, C1; . . . ;G0, G1. For a detailed description on how this is done, see the following section entitled: *Carry Generate and Carry Propagate Functions.*

The carry lookahead logic, which calculates intermediate binary tree values, is implemented by the circuit as follows. In cell 100 of FIG. 3, addend bit 116 and addend bit 117 are coupled through an "AND" gate 150, and an "OR" gate 140. The output of gates 150 and 140 enter a binary tree logic box 175 and are coupled with an input wire 118, labeled A0, and an input wire 119 labeled A1. Two levels are used to accomplish this coupling: An "AND" gate 180, and an "AND" gate 190 form the first level, while an "OR" gate 170 and an "OR" gate 160 form the second level.

Logic box 175 has an output wire 176, and an output wire 177. Output wire 176 and output wire 177 are in the series of output wires 125 and are labelled A0 and A1 respectively.

Using Boolean Logic:

A0(out) = (A*B) + ((A+B)*A0(in))   (Equation 1)

A1(out) = (A*B) + ((A+B)*A1(in))   (Equation 2)

were A is addend bit 116, B is addend bit 117, A0(in) is input wire 118, A1(in) is input wire 119, A0(out) is output wire 176, and A1(out) is output wire 177.

In cell 200 of FIG. 3, A0 indicates whether there has been a carry generated in cell 100, A1 indicates whether a carry could be propagated through cell 100. In cell 300, A0 indicates whether there has been a carry generated in cell 200; A1 indicates whether a carry could be propagated through cell 200; B0 indicates whether there has been a carry generated in cell 100, B1 indicates whether a carry could be propagated through cell 100. In cell 400, A0 indicates whether there has been a carry generate in successive cells 200 and 300, A1 indicates whether a carry could be propagated through successive cells 200 and 300; B0 indicates whether there has been a carry generated in cell 100, B1 indicates whether a carry could be propagated through cell 100.

Figure 4:
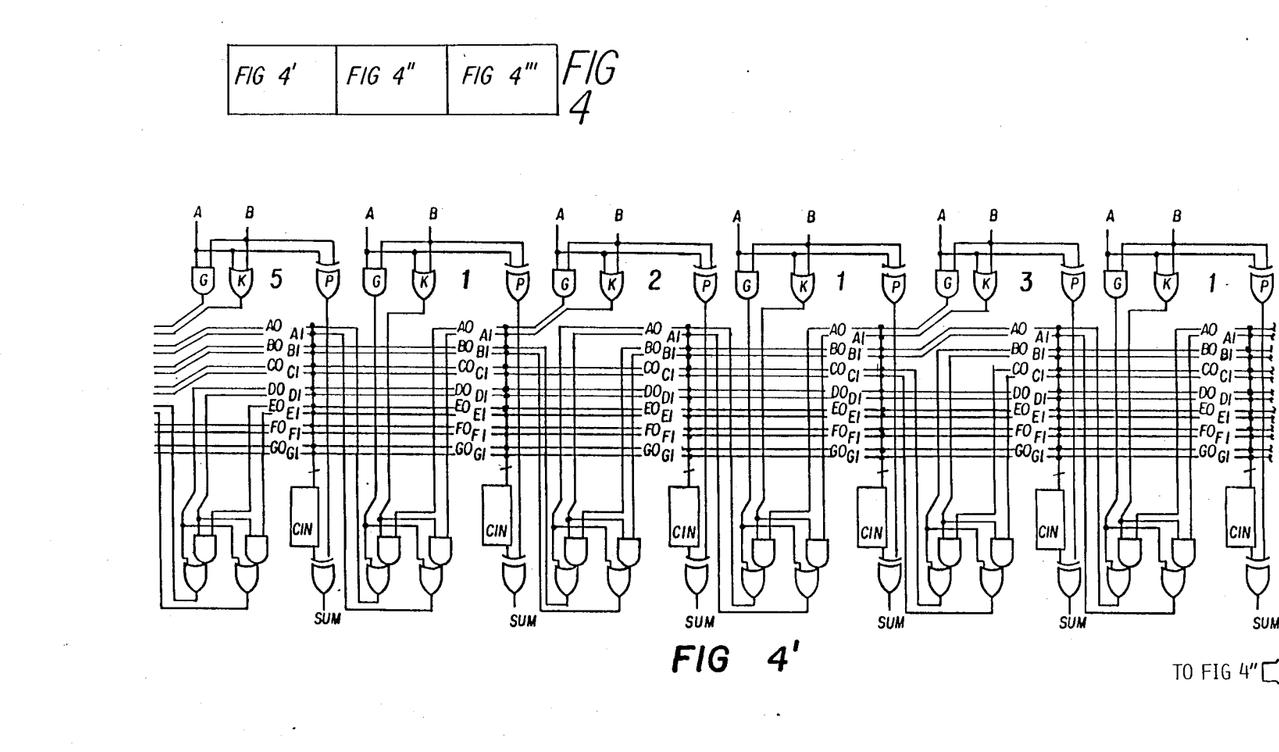
FIG. 4, consisting of FIGS. 4', 4'', and 4''', shows the schematic of a 16 bit adder embodying the present invention.
Figure 4A:
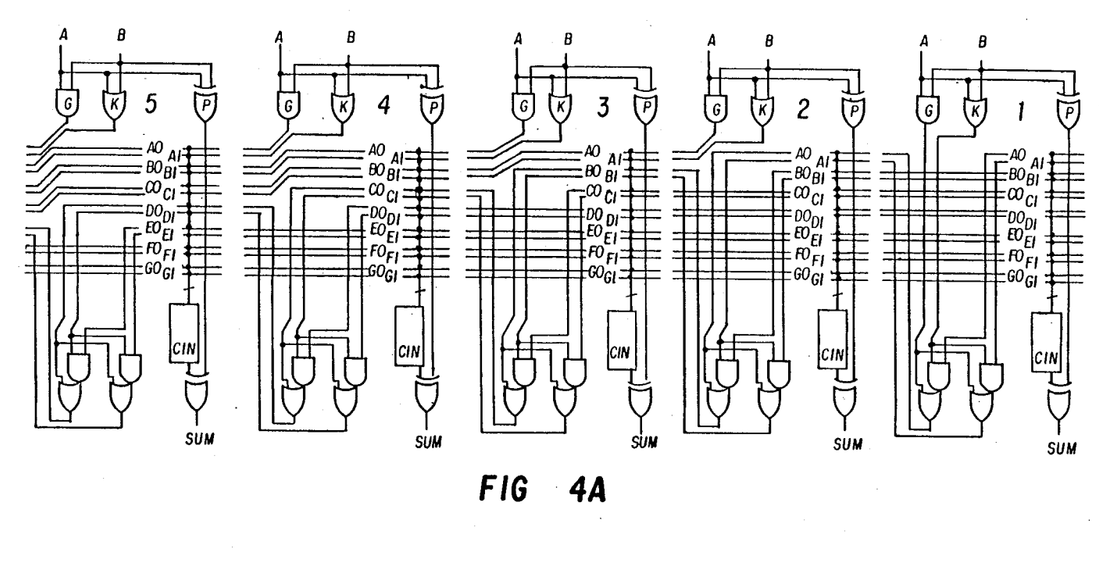
FIG. 4A shows 5 individual cells of the 16 bit adder embodies in FIG. 5.
Figure 5:
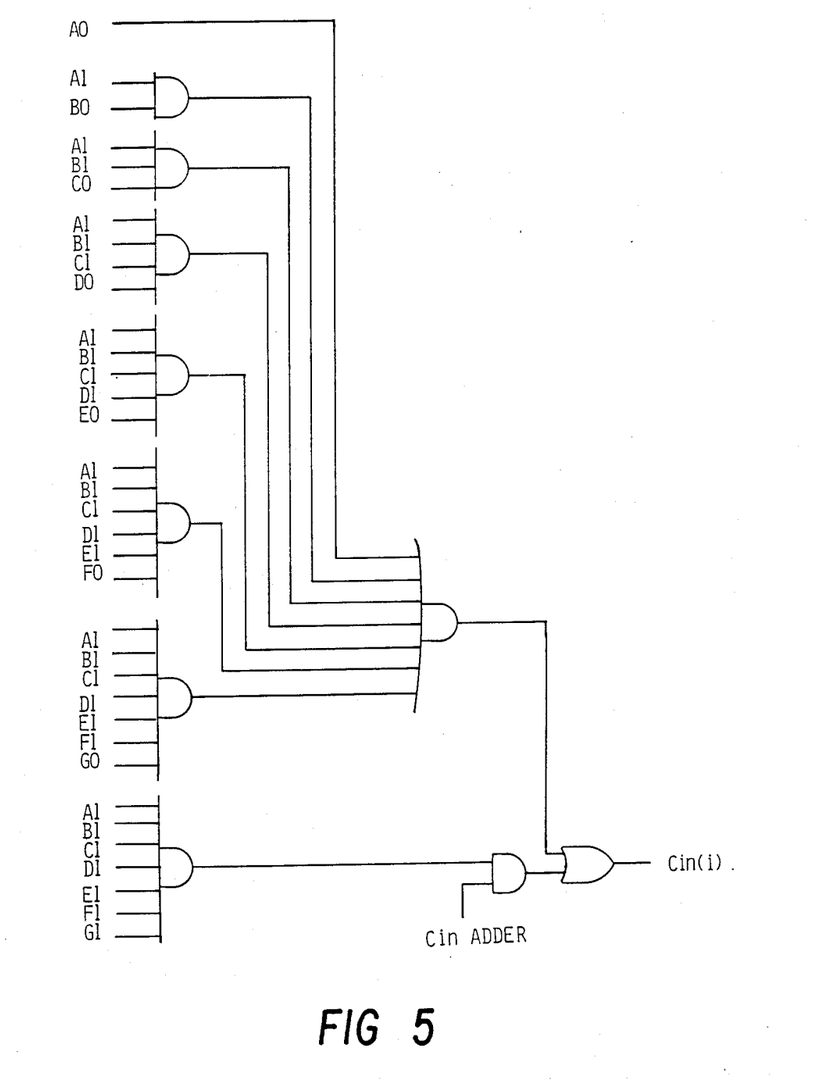
FIGS. 5 and 6 show alternative embodiments of a carry-in logic box utilized in the adders shown in FIGS. 3 and 4.
Figure 6:
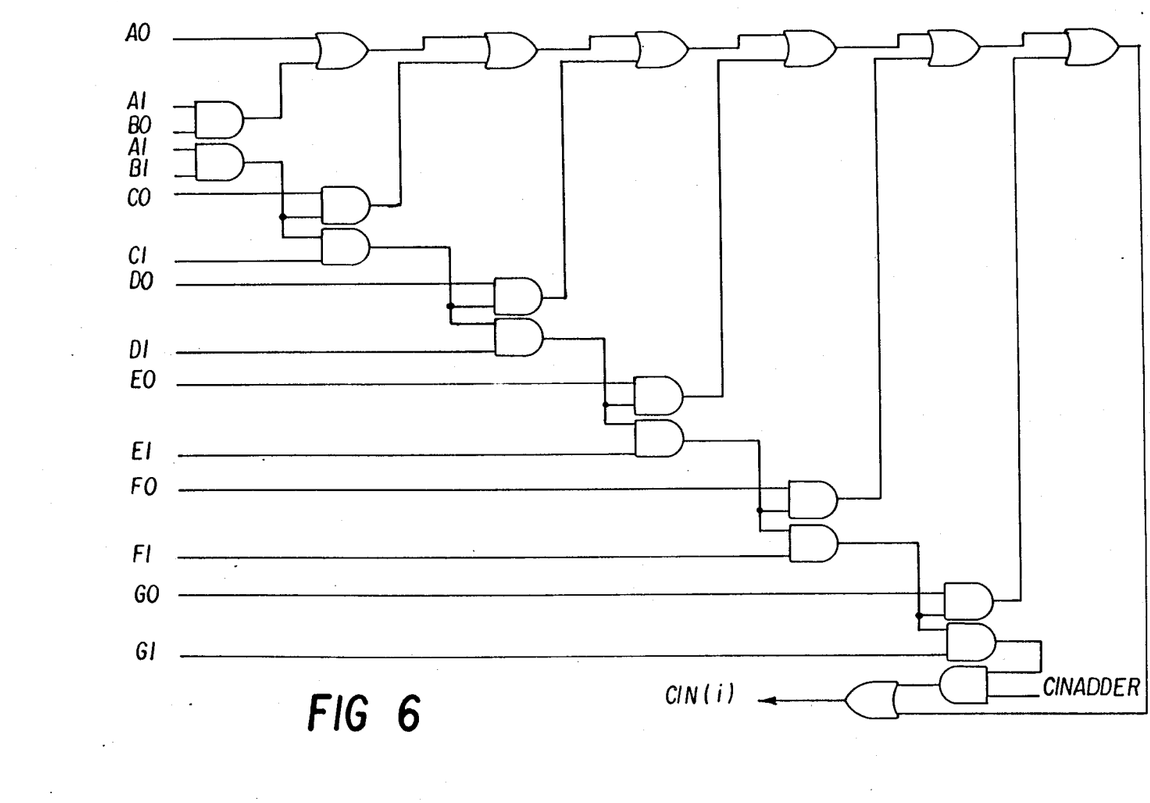

The information on lines A0, A1; . . . ; G0, G1, is utilized by an identical logic box in each cell—for example logic box 130 in cell 100 of FIG. 3—to determine whether a carry-in exists for that cell. FIG. 5 and FIG. 6 are alternate embodiments for the logic within logic box 130. The inputs labeled A0, A1 B0, B1, C0, C1, D0, D1, E0, E1, F0, F1, G0, and G1, refer to the similarly labeled wires in FIGS. 3 and 4 at the input to each of the cells. The logic is identical for each cell in the 8 bit full adder of FIG. 3.

The boolean function for the logic circuit embodied in FIG. 5 is:

$$C_j(in) = A0 + (A1 * B0) + (A1 * B1 * C0) +$$
$$(A1 * B1 * C1 * D0) + (A1 * B1 * C1 * D1 * E0) +$$
$$(A1 * B1 * C1 * D1 * E1 * F0) +$$
$$(A1 * B1 * C1 * D1 * E1 * F1 * G0) +$$
$$(A1 * B1 * C1 * D1 * E1 * F1 * G1 * C(inadder))$$

Carry generate inputs A0, . . . , G0 are initialized by the circuit at logic 0. Carry propagate inputs A1, . . . ,G1 are initialized at logic 1. For any cell, input pair A0, A1 indicates whether there has been a carry generate or a carry propagate in the prior cell(s) of the highest order. Input pair B0, B1 indicates whether there has been a carry generate or a carry propagate in prior cell(s) of the next highest order, and so on through pair G0, G1. If there is a carry generate in the cell(s) represented by input A0, then $C_j(in)$ is at logic 1. If there is a carry generate in the cell(s) represented by B0, and a carry propagate in the cell(s) represented by A1, then $C_j(in)$ is at logic 1. If there is a carry generate in the cell(s) represented by C0, and a carry propagate in the cell(s) represented by A1, and the cell(s) represented by B1, then $C_j(in)$ is at logic 1. And so on for cells D0 through G0. If there is a carry-in to the adder (C(inadder)), then this also causes $C_j(in)$ to be at logic 1 if A1, . . . , G1 are all at logic one, indicating every prior cell or groups of cells represented by A1, . . . , G1 have a carry propagate.

Figure 3A:
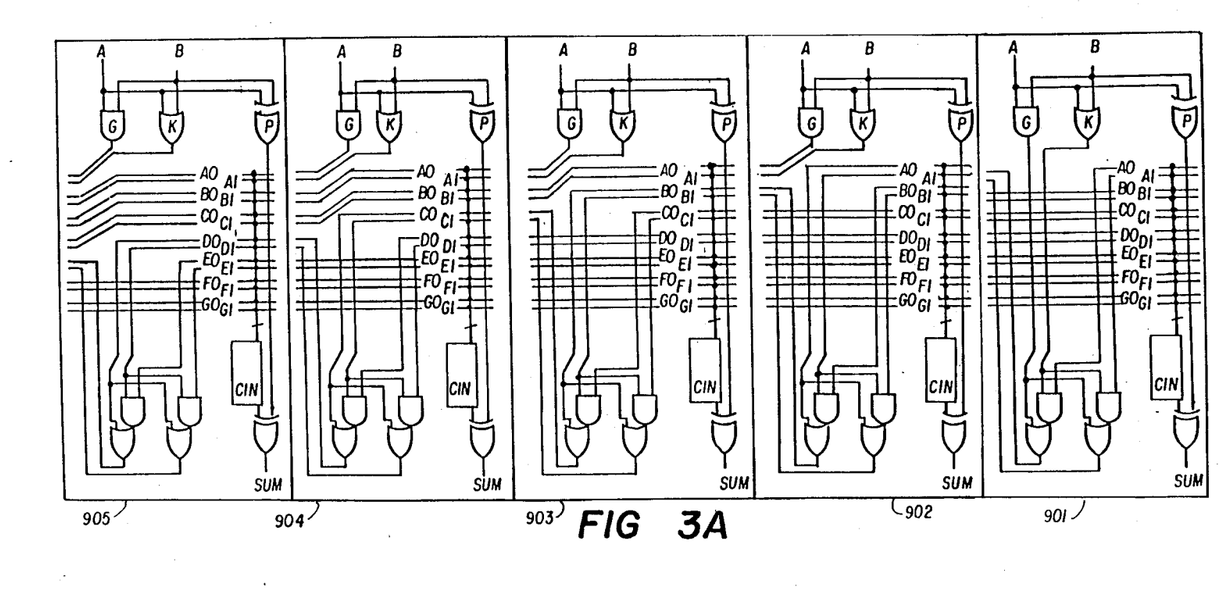
FIG. 3A shows 5 individual cells, four of which are utilized in the 8 bit adder of FIG. 3.

The embodiment of the present invention in FIG. 3 requires only 4 cell types in order to create a full 8 bit adder. A cell 901 in FIG. 3A is identical to cell 100, a cell 300, a cell 500, and a cell 700 in FIG. 3. A cell 902 in FIG. 3A is identical to cell 200, and a cell 600 in FIG. 3. A cell 903 in FIG. 3A is identical to a cell 400 in FIG. 3. A cell 904 in FIG. 3A is identical to a cell 800 in FIG. 3.

The differences in each cell type are minimal. For instance, cell 200 differs from cell 100 only in that a binary tree logic box 275 of cell 200 has different inputs than corresponding logic box 175 of cell 100, and a series of output lines 225 are determined differently than the corresponding output lines 125 of cell 100.

Adding only one more cell type, a cell 905 in FIG. 3A, a sixteen bit full adder can be constructed. FIG. 4 shows the logic for a 16 bit full adder according to the preferred embodiment of the present invention.

Many of the wires appear to be superfluous. For example, in cell 400 of FIG. 3, only wires A0, A1, B0, and B1 are necessary to calculate whether there is a carry-in to cell 400; however wires C0, C1 through G0, G1 are included in calulations performed by a carry-in logic box 430. This superfluity is present to maximize the similarity between cells, thus minimizing complexity.

Figure 7:
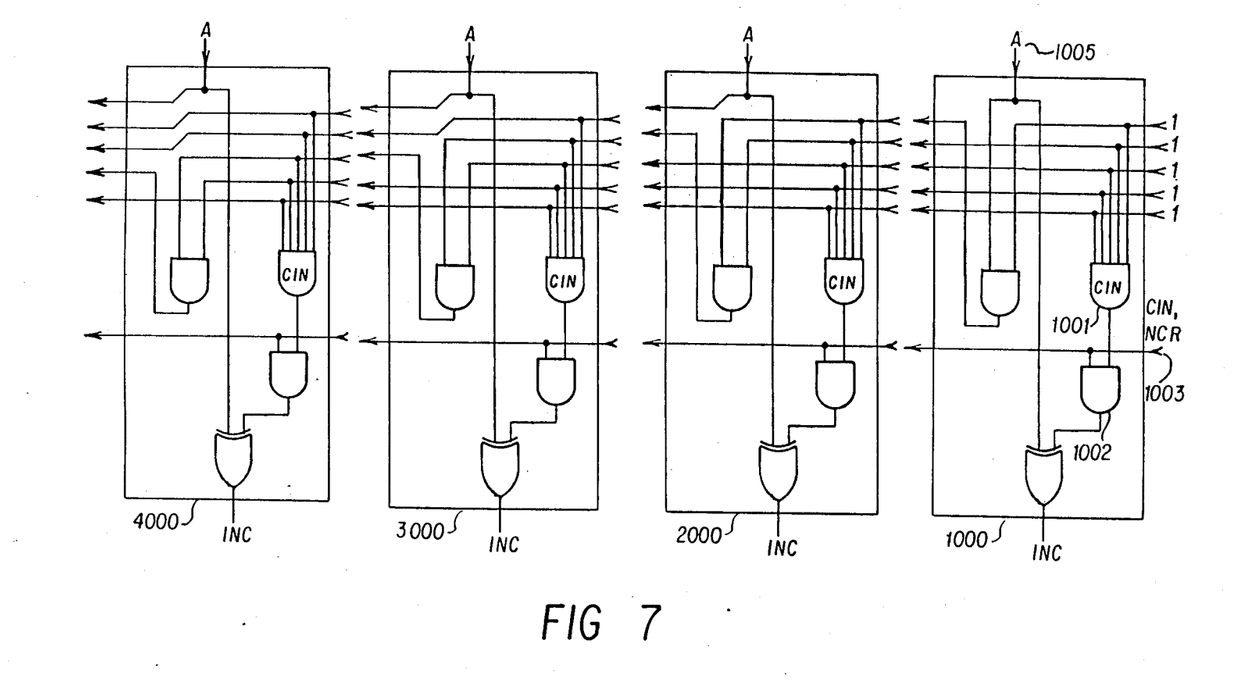
FIG. 7 shows a schematic of an increment function embodying the present invention.

In FIG. 7 the present invention is shown embodied within cells of an incrementer. Wires entering each cell, for example, wires A1, B1, C1, D1, and E1 in a cell 1000, are coupled through a series of boolean "AND" gates, for example a gate 1001 and a gate 1002 in cell 1000, which serve to calculate intermediate binary tree values, in this case used to determine whether a carry-in has been propagated to, for instance, input 1003 of cell 1000. Boolean "EXCLUSIVE OR" gates, for example a gate 1004 of cell 1000, couple an operand bit corresponding to a cell, for example an operand bit 1005 corresponding to cell 1000, with the output of gate 1002. The "EXCLUSIVE OR" gates serve as the means to accomplish an arithmetic function, in this case the increment function This embodiment also has limited cell types to minimize complexity.

Carry Generate and Propagate Functions

The adder performs carry lookahead as follows. Pairs of wires labelled: A0, A1; B0, B1; C0, C1; ... ;G0, G1, enter and exit each cell. Wires A0, A1; ... ; G0, G1, indicate whether a carry has been generated or propagated through zero, one, or more prior cells. A single cell generates a carry when the cell has a carry-out regardless of whether the cell has a carry-in. A single cell propagates a carry when the cell has a carry-out at least when the cell has a carry-in. A plurality of consecutive cells generates a carry when the highest order cell has a carry-out regardless of whether the lowest order cell has a carry-in. Similarly, a plurality of consecutive cells propagates a carry when the highest order cell has a carry-out at least when the the lowest order cell has a carry-in.

More specifically, a single cell adding the $j^{th}$ order bits of two addends, generates a carry if both of the $j^{th}$ order bits are logic ones, i.e., $$Cg_j = A_j * B_j \quad \text{(Equation 3)}$$

where $Cg_j$ is the carry generate at cell j, $A_j$ is the $j^{th}$ order bit of one of the addends, and $B_j$ is the $j^{th}$ order bit of the other addend.

A single cell adding the $j^{th}$ order bits of two addends propagates a carry, if either $j^{th}$ order bit addend is a logic one, i.e., when $$Cp_j = A_j + B_j \quad \text{(Equation 4)}$$

where $Cp_j$ is the carry propagate at cell j, $A_j$ is the $j^{th}$ order bit of one of the addends, and $B_j$ is the $j^{th}$ order bit of the other addend.

Carry generate and carry propagate can also be calculated for more than one cell, when the cells are in succession. For instance, two successive cells summing addend bits of order $j-1$ and j, respectively, generate a carry according to the following boolean equation:

$$Cg_{j-1,j} = CG_j + (Cp_j * Cg_{j-1}) \quad \text{(Equation 5)}$$

where $Cg_{j-1,j}$ is the carry generate for successive cells of $j-1$ and j, $Cg_{j-1}$ is the carry generate for the single cell of order $j-1$—i.e., $Cg_{j-1} = A_{j-1} * B_{j-1}$—and $Cp_{j-1}$ is the carry propagate for the cell of order $j-1$—i.e., $Cp_{j-1} = A_{j-1} + B_{j-1}$. Similarly the same two cells propagate a carry according to the following boolean equation:

$$Cp_{j-1,j} = Cg_j + (Cp_j * Cp_{j-1}) \quad \text{(Equation 6)}$$

A carry generate and carry propagate over successive cells $j-2$, $j-1$, and j, could be determined by the following logic:

$$Cg_{j-2,j} = Cg_j + (Cp_j * Cg_{j-2,j-1}); \quad \text{(Equation 7)}$$

-continued
$$= Cg_j + (Cp_j * (Cg_{j-1} + (Cp_{j-1} * Cg_{j-2})))$$

$$Cp_{j-2,j} = Cg_j + (Cp_j * Cp_{j-2,j-1}); \quad \text{(Equation 8)}$$

$$= Cg_j + (Cp_j * (Cg_{j-1} + (Cp_{j-1} * Cp_{j-2})))$$

Using logic box 175, and similar logic boxes in cells 100, 200, 300, ... ,700, the logic in Equation 3 through Equation 8 can be implemented. For example, if in Equation 1 and in Equation 2 Cg is substituted for A0(out), Cp is substituted for A1(out), A0(in) is initialized at 0, and A1(in) is initialized at 0, then Equation 1 and Equation 2 become $$Cg = A * B \quad \text{(Equation 9)}$$

$$Cp = A + B \quad \text{(Equation 10)}$$

which are similar to Equation 3 and Equation 4, respectively. If, in Equations 1 and 2 $Cg_{j-1,j}$ is substituted for A0(out), $Cp_{j-1,j}$ is substituted for A1(out), $Cg_j$ is substituted for (A*B), $Cp_j$ is substituted for (A+B), $Cg_{j-1}$ is substituted for A0(in), and $Cp_{j-1}$ is substituted for A1(in), then Equation 1 and Equation 2 become:

$$Cg_{j-1,j} = Cg_j + (Cp_j * Cg_{j-1}) \quad \text{(Equation 11)}$$

$$Cg_{j-1,j} = Cg_j + (Cp_j * Cp_{j-1}) \quad \text{(Equation 12)}$$

which are equivalent to Equation 5 and Equation 6, respectively. By serially coupling carry lookahead logic boxes, such as logic lookahead box 175, Equation 7 and Equation 8 can also be generated. Similarly, logic for determining carry generate and carry propage through four or more cells can be generated.

What is claimed is:

1. An apparatus for performing arithmetic functions on an integrated circuit, the apparatus comprising:
   a plurality of cells, each cell containing a plurality of components, the number of components in each cell being substantially the same for every cell, a first portion of the components being arranged to form a driving means for performing arithmetic functions; and,
   a binary tree means for combining data and propagating data in a binary tree, the binary tree means being incorporated in the plurality of cells, a second portion of the components in each cell being arranged so that each cell in the plurality of cells contains part of the tree means, wherein when the binary tree is full, the number of layers of logic in the binary tree means is essentially proportional to the base two logarithm of the number of cells in the plurality of cells.

2. An apparatus as in claim 1 wherein a first portion of the binary tree means within each cell of the plurality of cells comprises:
   a tree input means for accepting intermediate binary tree values from a prior cell; and,
   a tree output means, coupled to the tree input means, for utilizing the intermediate binary tree values to produce resulting intermediate binary tree values for use by a next succeeding cell.

3. An apparatus as in claim 2 wherein the driving means comprises:
   a function input means for accepting a digit from an operand; and, a function output means coupled to the function input means and the tree input means for combining the intermediate binary tree values with the digit of the operand to produce a digit of a resultant.

4. An apparatus as in claim 3 wherein the arithmetic function is incrementation.

5. An apparatus as in claim 3 wherein:
the arithmetic function is addition;
the function input means accepts one digit from each of two operands;
the first portion of the tree output means combines the intermediate binary tree values with the digits from each of the two operands;
the function output means combines the intermediate binary tree values with the digits from each of the two operands; and
the resultant is a sum.

6. An arithmetic circuit on an integrated circuit comprising a plurality of logic cells, the logic cells being coupled serially, and each logic cell having substantially the same number of components as every other logic cell, the components in each logic cell being arranged so that each logic cell comprises:
a function input means for accepting a digit from an operand;
a binary tree input means for accepting intermediate binary tree values from a prior cell;
a binary tree output means, coupled to the function input means and the tree input means, for combining the intermediate binary tree values with the digit of the operand to produce intermediate binary tree values for use by a next succeeding cell, wherein when the binary tree is full the total number of layers of logic for all binary tree output means in every cell of the plurality of cells is essentially proportional to the base two logarithm of the number of cells in the plurality of cells;
a function output means coupled to the function input means and the tree input means for combining the intermediate binary tree values with the digit of the operand to produce a digit of a resultant.

7. An arithmetic circuit as in claim 6 wherein each logic cell performs incrementation.

8. An arithmetic circuit as in claim 7 wherein:
the binary tree input means includes a first plurality of wires;
the function input means includes a first wire;
the binary tree output means includes a second plurality of wires, the second plurality of wires coupled to the first plurality of wires and the first wire, and a gate means for performing a Boolean "AND" between data from two wires, the two wires being from the first plurality of wires and the first wire; and,
the function output means includes a second gate means for performing a Boolean "AND" between data from each wire in the plurality of wires and a third gate means for performing a Boolean "XOR" between data from an output of the second gate means and data from the input wire.

9. An arithmetic circuit as in claim 6 wherein:
each logic cell performs addition;
the function input means accepts one digit from each of two operands;
the binary tree output means combines the intermediate binary tree values with the digits from each of the two operands;
the function output means combines the intermediate binary tree values with the digits from each of the two operands; and
the resultant is a sum.

10. An arithmetic circuit as in claim 9 wherein:
the binary tree input means includes a first plurality of generate wires and a first plurality of propagate wires;
the function input means includes a first wire accepting a first digit from a first of the two operands and a second wire accepting a second digit from a second of the two operands;
the binary tree output means includes a second plurality of generate wires and a second plurality of propagate wires, the second plurality of generate wires being coupled to the first plurality of generate wires and the second plurality of propagate wires being coupled to the first plurality of propagate wires and a gating means for performing logic functions on data from a plurality of inputs, the inputs including the first wire, the second wire, a first generate wire from the first plurality of generate wires, and a first propagate wire from the first plurality of propagate wires, a first resultant of the logic functions being coupled to the second plurality of generate wires and a second resultant of the logic functions being coupled to the second plurality of propagate wires; and,
the function output means includes a series of Boolean logic gates.

* * * * *